United States Patent
Burgess et al.

(10) Patent No.: US 11,802,588 B2
(45) Date of Patent: Oct. 31, 2023

(54) BEARING FOR STEERING ASSEMBLY

(71) Applicant: SAINT-GOBAIN PERFORMANCE PLASTICS RENCOL LIMITED, Coventry (GB)

(72) Inventors: James K. Burgess, Gloucester (GB); Neil James, Chepstow (GB); James Upton, Bristol (GB); David Long, Bristol (GB); Alejandro Pena, Bristol (GB)

(73) Assignee: SAINT-GOBAIN PERFORMANCE PLASTICS RENCOL LIMITED, Coventry (GB)

( * ) Notice: Subject to any disclaimer, the term of this patent is extended or adjusted under 35 U.S.C. 154(b) by 232 days.

(21) Appl. No.: 17/149,831

(22) Filed: Jan. 15, 2021

(65) Prior Publication Data
US 2021/0222730 A1    Jul. 22, 2021

Related U.S. Application Data

(60) Provisional application No. 62/961,879, filed on Jan. 16, 2020.

(51) Int. Cl.
*F16C 27/02*    (2006.01)
*F16C 17/02*    (2006.01)

(52) U.S. Cl.
CPC .............. *F16C 27/02* (2013.01); *F16C 17/02* (2013.01); *F16C 2326/24* (2013.01)

(58) Field of Classification Search
CPC ...... F16C 17/02; F16C 27/02; F16C 2326/24; F16H 55/24; F16H 1/16; B62D 5/00; F16D 1/0835
See application file for complete search history.

(56) References Cited

U.S. PATENT DOCUMENTS

| | | | |
|---|---|---|---|
| 3,434,761 A | 3/1969 | Marley | |
| 7,213,677 B2 * | 5/2007 | Nakamura | B62D 5/0409 180/444 |
| 7,748,492 B2 | 7/2010 | Iwasa et al. | |
| 7,814,808 B2 | 10/2010 | Shimizu et al. | |
| 8,695,751 B2 | 4/2014 | Wilkes et al. | |

(Continued)

FOREIGN PATENT DOCUMENTS

| | | |
|---|---|---|
| CH | 152333 A | 1/1932 |
| DE | 102012101147 A1 | 8/2013 |

(Continued)

OTHER PUBLICATIONS

International Search Report and Written Opinion for PCT/EP2021/050839, dated Apr. 30, 2021, 15 pages.

*Primary Examiner* — Alan B Waits
(74) *Attorney, Agent, or Firm* — Abel Schillinger, LLP; Ann Palma

(57) ABSTRACT

A bearing for disposition between a housing and a rotating member, the bearing including: at least one leaf spring element that provides a biasing force in a Y direction; where the bearing has a first stiffness, $S_1$, in the Y direction and a second stiffness, $S_2$, in an X direction perpendicular to the Y direction, where $S_2 \geq S_1$, and where the bearing includes a metal substrate and a low friction layer overlying at least one surface of the substrate and adapted to contact the rotating member.

18 Claims, 4 Drawing Sheets

(56) References Cited

U.S. PATENT DOCUMENTS

| | | | |
|---|---|---|---|
| 9,051,003 | B2 | 6/2015 | Galehr |
| 9,568,044 | B2 | 2/2017 | Kang |
| 9,835,240 | B2 | 12/2017 | Chauvrat et al. |
| 10,507,751 | B2 | 12/2019 | James et al. |
| 10,550,919 | B2 | 2/2020 | Appleyard |
| 10,619,716 | B2 | 4/2020 | Wilkes |
| 10,655,729 | B2 | 5/2020 | Wilson-Jones et al. |
| 2005/0161277 | A1 | 7/2005 | Bock et al. |
| 2007/0163375 | A1* | 7/2007 | Counts .................. B62D 3/123 74/422 |
| 2007/0193819 | A1* | 8/2007 | Iwasa .................... F16C 23/08 180/444 |
| 2012/0048640 | A1* | 3/2012 | Hamakita ............ B62D 5/0409 180/444 |
| 2013/0126260 | A1 | 5/2013 | Kim |
| 2015/0001025 | A1 | 1/2015 | Slayne et al. |
| 2015/0028644 | A1 | 1/2015 | Hagan et al. |
| 2015/0114549 | A1* | 4/2015 | Slayne .................. F16D 1/0835 156/220 |
| 2016/0201760 | A1* | 7/2016 | Kwon ..................... F16H 55/24 74/409 |
| 2016/0201786 | A1 | 7/2016 | Chauvrat et al. |
| 2016/0318545 | A1* | 11/2016 | Uchihara ............. B62D 5/0454 |
| 2018/0283457 | A1 | 10/2018 | Plioska et al. |
| 2018/0306248 | A1 | 10/2018 | Itta et al. |
| 2019/0202329 | A1 | 7/2019 | James et al. |
| 2019/0202489 | A1 | 7/2019 | Muehling et al. |
| 2019/0226571 | A1 | 7/2019 | Appleyard et al. |

FOREIGN PATENT DOCUMENTS

| | | |
|---|---|---|
| EP | 1731404 A1 | 12/2006 |
| EP | 3274241 B1 | 12/2018 |
| EP | 3274242 B1 | 12/2018 |
| FR | 2278983 A1 | 2/1976 |
| JP | 2004203154 A | 7/2004 |
| JP | 2007285472 A | 11/2007 |
| JP | 2014019291 A | 2/2014 |
| JP | 2018204661 A | 12/2018 |
| KR | 20140142023 A | 12/2014 |
| WO | 2021144438 A1 | 7/2021 |

* cited by examiner

BEARING FOR STEERING ASSEMBLY

CROSS-REFERENCE TO RELATED APPLICATION(S)

This application claims priority under 35 U.S.C. § 119(e) to U.S. Provisional Application No. 62/961,879, entitled "BEARING FOR STEERING ASSEMBLY," by James K. BURGESS et al., filed Jan. 16, 2020, which is assigned to the current assignee hereof and incorporated herein by reference in its entirety.

FIELD OF THE DISCLOSURE

The present disclosure is directed to bearing and bearing assemblies, particularly the present disclosure is directed to a steering assembly.

DESCRIPTION OF THE RELATED ART

Many vehicles use a steering assembly to translate motion from the steering wheel to the turning wheels on the road. In some cases, the steering assembly may include a power-assisted steering assembly to provide better vehicle performance by applying assistance torque in helping steer the vehicle. To aid in this function, in a number of cases, power-assisted steering assemblies incorporate a worm gear and a worm wheel for transferring torque from an electric motor to a steering column or output shaft operatively connected thereto. One problem with these assemblies is rattling between the worm gear and worm wheel which is especially noticeable to a driver when driving on rough roads or when the steering wheel is swayed from side to side under low load. If the worm gear and worm wheel teeth are not correctly meshed at all times, noise may be produced which may be heard by the driver. This incorrect meshing may arise due to manufacturing tolerances, thermal changes in dimensions, distortion due to torsional loads and wear during service. Accordingly, the industry continues to need improvements in steering assemblies.

BRIEF DESCRIPTION OF THE DRAWINGS

The present disclosure can be better understood, and its numerous features and advantages made apparent to those skilled in the art by referencing the accompanying drawings.

The use of the same reference symbols in different drawings indicates similar or identical items.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the bearing assembly or steering assembly arts.

Figure 1:
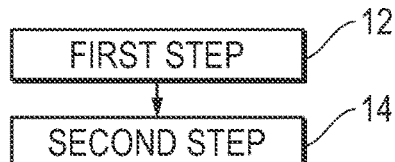
FIG. 1 includes a stepwise manufacturing process.

For purposes of illustration, FIG. 1 includes a diagram showing a stepwise manufacturing process 10 for forming a bearing. The forming process 10 may include a first step 12 of providing a material or composite material including a substrate. The forming process 10 may further include a second step 14 of manipulating the ends of the material or composite material to form a bearing.

Figure 2A:
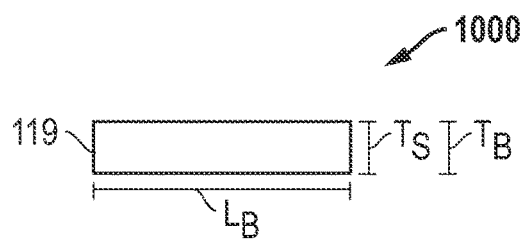
FIG. 2A includes an illustration of a material that may be formed into a bearing according to a number of embodiments.

FIG. 2A includes an illustration of a material 1000 that may be formed into the bearing of the first step 12 of the forming process 10. The bearing may include a substrate 119. In an embodiment, the substrate 119 can at least partially include a metal. According to certain embodiments, the metal may include iron, copper, titanium, tin, aluminum, alloys thereof, or may be another type of metal. More particularly, the substrate 119 can at least partially include a steel, such as, a stainless steel, carbon steel, or spring steel. For example, the substrate 119 can at least partially include a stainless steel. The stainless steel may be annealed, ¼ hard, ½ hard, ¾ hard, or full hard. Moreover, the steel can include stainless steel including chrome, nickel, or a combination thereof. In an embodiment, the substrate 119 may include a woven mesh or an expanded metal grid. The woven mesh or expanded metal grid can include a metal or metal alloy such as aluminum, steel, stainless steel, bronze, or the like. Alternatively, the woven mesh can be a woven polymer mesh. In an alternate embodiment, the substrate 119 may not include a mesh or grid. Further, the substrate 119 can include a Vickers pyramid number hardness, VPN, which can be ≥350, such as ≥375, ≥400, ≥425, or ≥450. VPN can also be ≤500, ≤475, or ≤450. VPN can also be within a range between, and including, any of the VPN values described herein. In another aspect, the substrate 119 can be treated to increase its corrosion resistance. In particular, the substrate 119 can be passivated. For example, the substrate 119 can be passivated according to the ASTM standard A967. The substrate 119 may be formed by at least one of chamfering, turning, reaming, forging, extruding, molding, sintering, rolling, or casting.

The substrate 119 can have a thickness Ts of between about 10 microns to about 1500 microns, such as between about 50 microns and about 1000 microns, such as between about 100 microns and about 750 microns, such as between about 350 microns and about 650 microns. In a number of embodiments, the substrate 119 may have a thickness Ts of between about 700 and 800 microns. In a number of embodiments, the substrate 119 may have a thickness Ts of between about 950 and 1050 microns. It will be further appreciated that the thickness Ts of the substrate 119 may be any value between any of the minimum and maximum values noted above. The thickness of the substrate 119 may be uniform, i.e., a thickness at a first location of the substrate 119 can be equal to a thickness at a second location therealong. The thickness of the substrate 119 may be non-uniform, i.e., a thickness at a first location of the substrate 119 can be different from a thickness at a second location therealong.

Figure 2B:
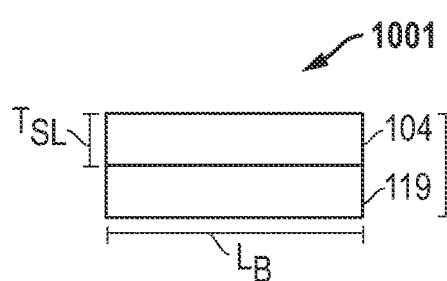
FIG. 2B includes an illustration of a composite material that may be formed into a bearing according to a number of embodiments.

FIG. 2B includes an illustration of a composite material 1001, alternative to the material 1000, that may be formed into the bearing of the first step 12 of the forming process 10. For purposes of illustration, FIG. 2B shows the layer-by-layer configuration of a composite material 1001 of the bearing. In a number of embodiments, the composite material 1001 may include substrate 119 (as mentioned above) and low friction layer 104 coupled to or overlying the substrate 119. In a more particular embodiment, the composite material 1001 may include a substrate 119 and a plurality of one low friction layers 104 overlying the substrate 119. As shown in FIG. 2B, the low friction layer 104 can be coupled to at least a portion of the substrate 119. In a particular embodiment, the low friction layer 104 can be coupled to a surface of the substrate 119 so as to form an interface with another surface of another component. The low friction layer 104 can be coupled to the radially inner surface of the substrate 119. Alternatively, the low friction layer 104 can be coupled to the radially outer surface of the substrate 119.

In a number of embodiments, the low friction layer 104 can include a low friction material. Low friction materials may include, for example, a polymer, such as a polyketone, a polyaramid, a polyphenylene sulfide, a polyethersulfone, a polypheylene sulfone, a polyamideimide, ultra high molecular weight polyethylene, a fluoropolymer, a polybenzimidazole, a polyacetal, polybutylene terephthalate (PBT), polyethylene terephthalate (PET), a polyimide (PI), polyetherimide, polyetheretherketone (PEEK), polyethylene (PE), a polysulfone, a polyamide (PA), polyphenylene oxide, polyphenylene sulfide (PPS), a polyurethane, a polyester, a liquid crystal polymer (LCP), or any combination thereof. In an example, the low friction layer 104 includes polyketone, such as polyether ether ketone (PEEK), polyether ketone, polyether ketone ketone, polyether ketone ether ketone, a derivative thereof, or a combination thereof. In an additional example, the low friction layer 104 may include an ultra high molecular weight polyethylene. In another example, the low friction layer 104 may include a fluoropolymer including fluorinated ethylene propylene (FEP), polytetrafluoroethylene (PTFE), polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), or ethylene chlorotrifluoroethylene copolymer (ECTFE). The low friction layer 104 may include a solid based material including lithium soap, graphite, boron nitride, molybdenum disulfide, tungsten disulfide, polytetrafluoroethylene, carbon nitride, tungsten carbide, or diamond like carbon, a metal (such as aluminum, zinc, copper, magnesium, tin, titanium, tungsten, iron, bronze, steel, spring steel, stainless steel), a metal alloy (including the metals listed), an anodized metal (including the metals listed) or any combination thereof. Fluoropolymers may be used according to particular embodiments. In an embodiment, the low friction layer 104 may include a woven mesh or an expanded metal grid. The woven mesh or expanded metal grid can include a metal or metal alloy such as aluminum, steel, stainless steel, bronze, or the like. Alternatively, the woven mesh can be a woven polymer mesh. In an alternate embodiment, the low friction layer 104 may not include a mesh or grid.

In a number of embodiments, the low friction layer 104 may further include fillers, including glass, carbon fibers, silicon, PEEK, aromatic polyester, carbon particles, bronze, fluoropolymers, thermoplastic fillers, aluminum oxide, polyamidimide (PAI), PPS, polyphenylene sulfone (PPSO2), LCP, aromatic polyesters, molybdenum disulfide, tungsten disulfide, graphite, graphene, expanded graphite, boron nitrade, talc, calcium fluoride, or any combination thereof. Additionally, the filler can include alumina, silica, titanium dioxide, calcium fluoride, boron nitride, mica, Wollastonite, silicon carbide, silicon nitride, zirconia, carbon black, pigments, or any combination thereof. Fillers can be in the form of beads, fibers, powder, mesh, or any combination thereof. The fillers may be at least 10 wt % based on the total weight of the low friction layer, such as at least 15 wt %, 20 wt %, 25 wt % or even 30 wt %.

In some embodiments, the low friction layer 104 may include a clamping material. The clamping material can include natural polyisoprene, synthetic polyisoprene, polybutadiene, chloroprene rubber, butyl rubber, styrene-butadiene rubber, nitrile rubber, ethylene propylene, rubber, ephichlorohydrin rubber, polyacrylic rubber, silicone rubber, fluorosilicone rubber, fluoroelastomers, perfluoroelastomers, polyether block amides, bitumen, polyethylene, chlorosulfonated polyethylene, ethyl-vinyl acetate (EVA), EVA form, low-density polyethylene form, nitrile rubber form, polychloroprene form, polyimide form, polypropylene form, polyurethane form, polystyrene foam, polyvinyl chloride foam, silicone foam, foam rubber, polyurethane foam, XPS foam, epoxy foam, phenolic foam, or any combination thereof. The damping layer 104 may include a solid based material including lithium soap, latex, graphite, boron nitride, molybdenum disulfide, tungsten disulfide, polytetrafluoroethylene, carbon nitride, tungsten carbide, or diamond like carbon, a metal (such as aluminum, zinc, copper, magnesium, tin, platinum, titanium, tungsten, iron, bronze, steel, spring steel, stainless steel), a metal alloy (including the metals listed), an anodized metal (including the metals listed) or any combination thereof.

In an embodiment, the low friction layer 104 can have a thickness $T_{SL}$ of between about 1 micron to about 500 microns, such as between about 10 microns and about 350 microns, such as between about 30 microns and about 300 microns, such as between about 40 microns and about 250 microns. In a number of embodiments, the low friction layer 104 may have a thickness $T_{SL}$ of between about 50 and 300 microns. It will be further appreciated that the thickness $T_{SL}$ of the low friction layer 104 may be any value between any of the minimum and maximum values noted above. The thickness of the low friction layer 104 may be uniform, i.e., a thickness at a first location of the low friction layer 104 can be equal to a thickness at a second location therealong. The thickness of the low friction layer 104 may be non-uniform, i.e., a thickness at a first location of the low friction layer 104 can be different from a thickness at a second location therealong. It can be appreciated that different low friction layers 104 may have different thicknesses. The low friction layer 104 may overlie one major surface of the substrate 119, shown, or overlie both major surfaces. The substrate 119 may be at least partially encapsulated by the low friction layer 104. That is, the low friction layer 104 may cover at least a portion of the substrate 119.

Figure 2C:
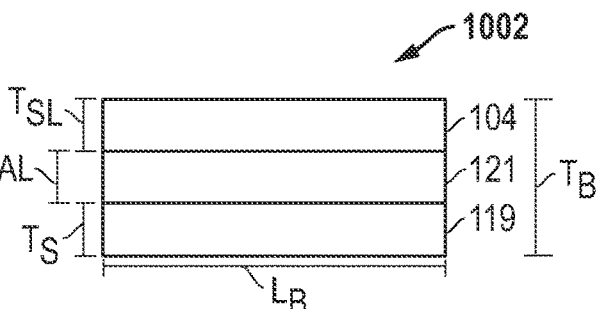
FIG. 2C includes an illustration of a composite material that may be formed into a bearing according to a number of embodiments.

FIG. 2C includes an illustration of an alternative embodiment of the composite material 1002, alternative to the materials 1000, 1001, that may be formed into the bearing of the first step 12 of the forming process 10. For purposes of illustration, FIG. 2C shows the layer-by-layer configuration of a composite material 1002 of the bearing. According to this particular embodiment, the composite material 1002 may be similar to the composite material 1001 of FIG. 2B, except this composite material 1002 may also include at least one adhesive layer 121 that may couple the low friction layer 104 to the substrate 119 and a low friction layer 104. In another alternate embodiment, the substrate 119, as a solid component, woven mesh or expanded metal grid, may be embedded between at least one adhesive layer 121 included between the low friction layer 104 and the substrate 119.

The adhesive layer 121 may include any known adhesive material common to the bearing arts including, but not limited to, fluoropolymers, epoxy resins, polyimide resins, polyether/polyamide copolymers, ethylene vinyl acetates, ethylene tetrafluoroethylene (ETFE), ETFE copolymer, perfluoroalkoxy (PFA), or any combination thereof. Additionally, the adhesive can include at least one functional group selected from —C=O, —C—O—R, —COH, —COOH, —COOR, —CF$_2$=CF—OR, or any combination thereof, where R is a cyclic or linear organic group containing between 1 and 20 carbon atoms. Additionally, the adhesive can include a copolymer.

Filler particles (functional and/or nonfunctional) may be added in to the adhesive layer 121 such as carbon fillers, carbon fibers, carbon particles, graphite, metallic fillers such as bronze, aluminum, and other metals and their alloys, metal oxide fillers, metal coated carbon fillers, metal coated polymer fillers, or any combination thereof.

In an embodiment, the hot melt adhesive can have a melting temperature of not greater than 250° C., such as not greater than 220° C. In another embodiment, the adhesive may break down above 200° C., such as above 220° C. In further embodiments, the melting temperature of the hot melt adhesive can be higher than 250° C. or even higher than 300° C. The adhesive layer 121 can have a thickness $T_{AL}$ of between about 1 micron to about 80 microns, such as between about 10 microns and about 50 microns, such as between about 20 microns and about 40 microns. In a number of embodiments, the adhesive layer 121 may have a thickness $T_{AL}$ of between about 3 and 20 microns. In a number of embodiments, the adhesive layer 121 may have a thickness $T_{AL}$ of between about 10 and 60 microns. It will be further appreciated that the thickness $T_{AL}$ of the adhesive layer 121 may be any value between any of the minimum and maximum values noted above. The thickness of the adhesive layer 121 may be uniform, i.e., a thickness at a first location of the adhesive layer 121 can be equal to a thickness at a second location therealong. The thickness of the adhesive layer 121 may be non-uniform, i.e., a thickness at a first location of the adhesive layer 121 can be different from a thickness at a second location therealong.

Figure 2D:
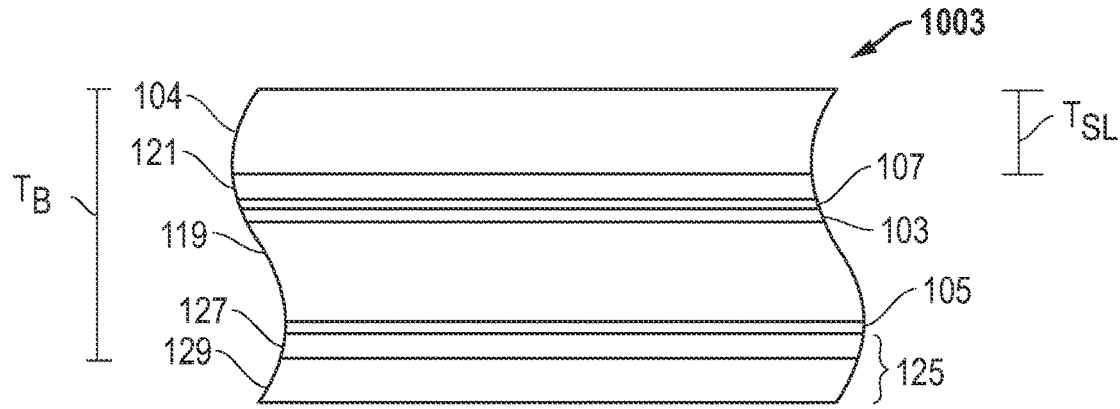
FIG. 2D includes an illustration of a composite material that may be formed into a bearing according to a number of embodiments.

FIG. 2D includes an illustration of an alternative embodiment of the composite material 1003, alternative to the materials 1000, 1001, 1002, that may be formed into the bearing of the first step 12 of the forming process 10. For purposes of illustration, FIG. 2D shows the layer-by-layer configuration of a composite material 1003 of the bearing. According to this particular embodiment, the composite material 1003 may be similar to the composite material 1002 of FIG. 2C, except this composite material 1003 may also include at least one corrosion protection layer 103 and 105, and a corrosion resistant coating layer 125 that can include an adhesion promoter layer 127 and an epoxy layer 129 that may couple to the substrate 119 and a low friction layer 104.

The substrate 119 may be coated with corrosion protection layers 103 and 105 including corrosion protection material to prevent corrosion of the composite material 1003 prior to processing. Additionally, a functional layer 107 can be applied over layer 103. Each of layers 103, 105, and 107 can have a thickness of about 1 to 50 microns, such as about 7 to 15 microns. Layers 103 and 105 can include corrosion protection materials including a phosphate of zinc, iron, manganese, or any combination thereof, or a nano-ceramic layer. Further, layers 103 and 105 can include corrosion protection materials including passivated surfaces, commercially available zinc (mechanical/galvanic) or zinc-nickel coatings, or any combination thereof. Layer 107 can include functional silanes, nano-scaled silane based primers, hydrolyzed silanes, organosilane adhesion promoters, solvent/water based silane primers. Corrosion protection layers 103 and 105 can be removed or retained during processing.

As stated above, the composite material 1003 may further include a corrosion resistant coating 125. The corrosion resistant coating 125 can have a thickness of about 1 to 50 microns, such as about 5 to 20 microns, and such as about 7 to 15 microns. The corrosion resistant coating 125 can include an adhesion promoter layer 127 and an epoxy layer 129. The adhesion promoter layer 127 can include corrosion protection materials including phosphate of zinc, iron, manganese, tin, or any combination thereof, or a nano-ceramic layer. The adhesion promoter layer 127 can include corrosion protection materials including functional silanes, nanoscaled silane based layers, hydrolyzed silanes, organosilane adhesion promoters, solvent/water based silane primers, chlorinated polyolefins, passivated surfaces, commercially available zinc (mechanical/galvanic) or Zinc-Nickel coatings, or any combination thereof. The adhesion promoter layer 127 can be applied by spray coating, e-coating, dip spin coating, electrostatic coating, flow coating, roll coating, knife coating, coil coating, or the like.

The epoxy layer 129 can be corrosion protection materials including a thermal cured epoxy, a UV cured epoxy, an IR cured epoxy, an electron beam cured epoxy, a radiation cured epoxy, or an air-cured epoxy. Further, the epoxy layer 129 can include corrosion protection materials including polyglycidylether, diglycidylether, bisphenol A, bisphenol F, oxirane, oxacyclopropane, ethylenoxide, 1,2-epoxypropane, 2-methyloxirane, 9,10-epoxy-9,10-dihydroanthracene, or any combination thereof. The epoxy layer 129 can further include a hardening agent. The hardening agent can include amines, acid anhydrides, phenol novolac hardeners such as phenol novolac poly[N-(4-hydroxyphenyl)maleimide] (PHPMI), resole phenol formaldehydes, fatty amine compounds, polycarbonic anhydrides, polyacrylate, isocyanates, encapsulated polyisocyanates, boron trifluoride amine complexes, chromic-based hardeners such as chromium, polyamides, or any combination thereof. Generally, acid anhydrides can conform to the formula R—C=O—O—C=O—R' where R can be CXHYXZAU as described above. Amines can include aliphatic amines such as monoethylamine, diethylenetriamine, triethylenetetraamine, and the like, alicyclic amines, aromatic amines such as cyclic aliphatic amines, cyclo aliphatic amines, amidoamines, polyamides, dicyandiamides, imidazole derivatives, and the like, or any combination thereof. Generally, amines can be primary amines, secondary amines, or tertiary amines conforming to the formula R1R2R3N where R can be CXHYXZAU as described above. In an embodiment, the epoxy layer 129 can include fillers to improve the conductivity, such as carbon fillers, carbon fibers, carbon particles, graphite, metallic fillers such as bronze, aluminum, and other metals and their alloys, metal oxide fillers, metal-coated carbon fillers, metal-coated polymer fillers, or any combination thereof. The conductive fillers can allow current to pass through the epoxy coating and can increase the conductivity of the composite material as compared to a composite material without conductive fillers. In an embodiment, the epoxy layer 129 can be applied by spray coating, e-coating, dip spin coating, electrostatic coating, flow coating, roll coating, knife coating, coil coating, or the like. Additionally, the epoxy layer 129 can be cured, such as by thermal curing, UV curing, IR curing, electron beam curing, irradiation curing, or any combination thereof. Preferably, the curing can be accomplished without increasing the temperature of the component above the breakdown temperature of any of the low friction layer 104, the adhesive layer 121, the substrate 119, or the adhesion promoter layer 127. Accordingly, the epoxy may be cured below about 250° C., even below about 200° C.

Figure 2E:
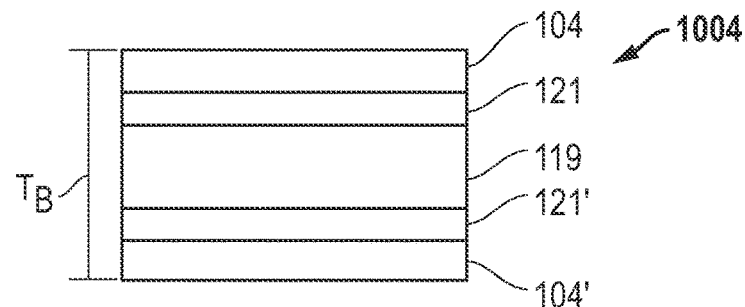
FIG. 2E includes an illustration of a composite material that may be formed into a bearing according to a number of embodiments.

FIG. 2E includes an illustration of an alternative embodiment of the composite material 1004, alternative to the materials 1000, 1001, 1002, and 1003 that may be formed into the bearing of the first step 12 of the forming process 10. According to this particular embodiment, the composite material 1004 may be similar to the composite material 1000 of FIG. 2C, except this composite material 1002 may include a substrate 119 and a plurality of low friction layers 1104, 1104' coupled to the substrate 119 by a plurality of adhesive layers 1121, 1121'. It may be understood that any of the intervening layers (i.e. corrosion protection layers 1704, 1705, and 1708, or corrosion resistant layer 1125 that can include an adhesion promoter layer 1127 and/or an epoxy layer 1129) of the composite material 1001 shown in FIG. 2D may be included between any of the layers shown in FIG. 2E in any orientation or stacking.

In a number of embodiments, the material or composite material 1000, 1001, 1002, 1003, 1004 may have a particular thickness $T_B$. According to certain embodiments, the thickness $T_B$ of the material or composite material 1000, 1001, 1002, 1003, 1004 may be at least about 0.1 mm or at least about 0.2 mm or at least about 0.5 mm or at least about 0.8 mm or even at least about 1.5 mm. According to still other embodiments, the $T_B$ of the material or composite material 1000, 1001, 1002, 1003, 1004 may be not greater than about 2 mm, such as, not greater than about 1.5 mm or even not greater than about 1.0 mm. It will be appreciated that the thickness $T_B$ of the material or composite material 1000, 1001, 1002, 1003, 1004 may be within a range between any of the minimum and maximum values noted above. It will be further appreciated that the thickness $T_B$ of the material or composite material 1000, 1001, 1002, 1003, 1004 may be any value between any of the minimum and maximum values noted above. It can also be appreciated that the thickness $T_B$ of the material or composite material 1000, 1001, 1002, 1003, 1004 may vary along its circumference. It can also be appreciated that thickness $T_B$ of the material or composite material 1000, 1001, 1002, 1003, 1004 may vary along its circumference and may vary across a plurality of materials or composite materials.

In an embodiment, under step 12 of FIG. 1, any of the layers on the material or composite material 1000, 1001, 1002, 1003, 1004, as described above, can each be disposed in a roll and peeled therefrom to join together under pressure, at elevated temperatures (hot or cold pressed or rolled), by an adhesive, or by any combination thereof. Any of the layers of the material or composite material 1000, 1001, 1002, 1003, 1004, as described above, may be laminated together such that they at least partially overlap one another. Any of the layers on the material or composite material 1000, 1001, 1002, 1003, 1004, as described above, may be applied together using coating technique, such as, for example, physical or vapor deposition, spraying, plating, powder coating, or through other chemical or electrochemical techniques. In a particular embodiment, the low friction layer 104 may be applied by a roll-to-roll coating process, including for example, extrusion coating. The low friction layer 104 may be heated to a molten or semi-molten state and extruded through a slot die onto a major surface of the substrate 119. In an embodiment, the material or composite material 1000, 1001, 1002, 1003, 1004, may be a single unitary strip of material.

In other embodiments, under step 12 of FIG. 1, any of the layers on the material or composite material 1000, 1001, 1002, 1003, 1004, as described above, may be applied by a coating technique, such as, for example, physical or vapor deposition, spraying, plating, powder coating, or through other chemical or electrochemical techniques. In a particular embodiment, the low friction layer 104 may be applied by a roll-to-roll coating process, including for example, extrusion coating. The low friction layer 104 may be heated to a molten or semi-molten state and extruded through a slot die onto a major surface of the substrate 119. In another embodiment, the low friction layer 104 may be cast or molded.

In an embodiment, the low friction layer 104 or any layers can be glued to the substrate 119 using the melt adhesive layer 121 to form a laminate. In an embodiment, any of the intervening or outstanding layers on the material or composite material 1000, 1001, 1002, 1003, 1004, may form an intermediate material, e.g. a laminate. The intermediate material can be cut into strips or blanks that can be formed into the bearing. The cutting of the intermediate material may include use of a stamp, press, punch, saw, or may be machined in a different way. Cutting the intermediate material can create cut edges including an exposed portion of the substrate 119.

In an embodiment, under the second step 14 of FIG. 1, the blanks (formed of the material or composite material 1000, 1001, 1002, 1003, 1004) can be formed into the bearing by manipulating the ends of the laminate strip or blank. The bearing may be formed by stamp, press, punch, saw, rolling, flanging, deep-drawing, or may be machined in a different way. After shaping the semi-finished bearing, the semi-finished bearing may be cleaned to remove any lubricants and oils used in the forming and shaping process. Additionally, cleaning can prepare the exposed surface of the load bearing substrate for the application of the coating. Cleaning may include chemical cleaning with solvents and/or mechanical cleaning, such as ultrasonic cleaning.

Figure 3A:
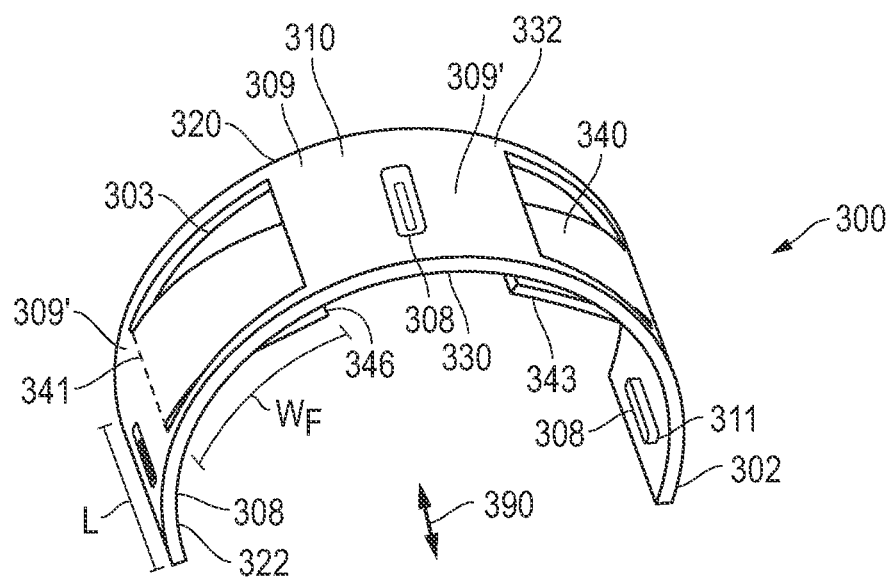
FIG. 3A includes an illustration of a top perspective view of a bearing according to a number of embodiments.

FIG. 3A includes an illustration of a top perspective view of a bearing 300 according to a number of embodiments and formed from a blank of material or composite material 1000, 1001, 1002, 1003, 1004 as described above. The bearing 300 may include a semi-annular band 302. The semi-annular band 302 may be formed from a blank as described above that may be curved into an arc-like shape about a central axis 390. The bearing 300 and/or semi-annular band 302 may have a first axial end 320, and a second axial end 322. The bearing 300 and/or semi-annular band 302 may have an inner surface 330, and an outer surface 332. The bearing 300 and/or semi-annular band 302 may have a first circumferential end 334, and a second circumferential end 336. An axial gap 338 may bridge the first circumferential end 334 and the second circumferential end 336. The inner surface 330 of the bearing 300 and/or semi-annular band 302 may have a low friction layer that conforms to the shape of the semi-annular band 302 with a substrate forming the outer surface 432, as formed from the material or composite material 1000, 1001, 1002, 1003, 1004 as described above. Alternatively or additionally, the outer surface 332 of the bearing 300 may have a low friction layer that conforms to the shape of the semi-annular band 302 with a substrate forming the inner surface 130, as formed from the material or composite material 1000, 1001, 1002, 1003, 1004 as described above. In other embodiments, the low friction layer may be laminated onto both surfaces of the bearing 300 and/or semi-annular band 302.

In a number of embodiments, the bearing 300 may overlie the rotating member 370. In a number of embodiments, the bearing 300 may overlie the rotating member 370 around less than 360 degrees of the rotating member's 370 circumference due to the presence of an axial gap 338 between the first circumferential end 334 and the second circumferential end 336. In a number of embodiments the bearing 300 may overlie the rotating member 370 at least 90 degrees, such as at least 120 degrees, such as at least 150 degrees, such as at least 180 degrees, such as at least 210 degrees, such as at least 240 degrees, such as at least 270 degrees, such as at least 300 degrees, such as at least 330 degrees of the circumference of the rotating member 370. In a number of embodiments, the bearing 300 may overlie the rotating member 370 no greater than 345 degrees, such as no greater than 300 degrees, such as no greater than 270 degrees, such as no greater than 240 degrees, such as no greater than 210 degrees, such as no greater than 180 degrees, such as no greater than 150 degrees, such as no greater than 119 degrees of the circumference of the inner steering member 104. In a number of embodiments, the bearing 300 may overlie the rotating member 370 between about 180 degrees and 300 degrees of the circumference of the rotating member 370.

In a number of embodiments, the bearing 300 may have a plurality of spaced radially extending projections 308 (e.g. waves) that extend radially inward from the inner surface 330 of the bearing 300. In an embodiment, the projections 308 may be contiguous with the semi-annular band 302 around the entirety of a periphery of the semi-annular band 302. The projections 308 may radially extend from the semi-annular band 302 and may be adapted to contact a mating component and provide enhanced stiffness in the direction in which they face. For example, FIG. 3B includes an illustration of an end view of a bearing 300 within an assembly according to a number of embodiments and formed from a blank of material or composite material 1000, 1001, 1002, 1003, 1004 as described above where the projections 308 extending radially inward and contact an inner rotating member 370 within a bore 385 of an outer member or housing 380 in an assembly 3000. The central axis 390 may be the central axis of the inner rotating member 370 as shown. The projections 308 may be formed from the material or composite material 1000, 1001, 1002, 1003, 1004 via stamping (e.g., pressed using a suitably shaped mold, rotary wave forming, etc.). Referring back to FIG. 3A, there may be a flat, circumferentially extending rim 310 of material or composite material at at least one axial end 320, 322 of the semi-annular band 302 of the bearing 300 above or below the projections 308. Each projection 308 also may be separated from its neighboring projections 308 by an unformed section 309 of the semi-annular band 302 of the bearing 300, which may be contiguously formed with rims 310 and spaced circumferentially between a first pair of adjacent projections 308. The projections 308 may include axially-elongated ridges that are waves commonly used on conventional bearings. In another embodiment, the projections 308 may have a polygonal cross-section from the central axis 390.

The projections 308 may include at least one polygonal angle. For example, the projections 308 may include a triangle or a quadrilateral shape extending from the semi-annular band 302. In yet another embodiment, at least one of the projections 408 may have an arcuate portion and a polygonal portion. In another embodiment, the projections 408 may have a semi-circular cross-section from the central axis 390. In another embodiment, the projections 308 may have a variable cross-section from the central axis 390. In an embodiment, at least two of the projections 308 may have the same geometric shape or size as compared to each other. In a further embodiment, all of the projections 308 may have the same geometric shape or size as compared to each other. In another embodiment, at least one of the projections 308 may have different geometric shapes or sizes as compared to each other. In a further embodiment, all of the projections 308 may have different geometric shapes or sizes as compared to each other.

Figure 3B:
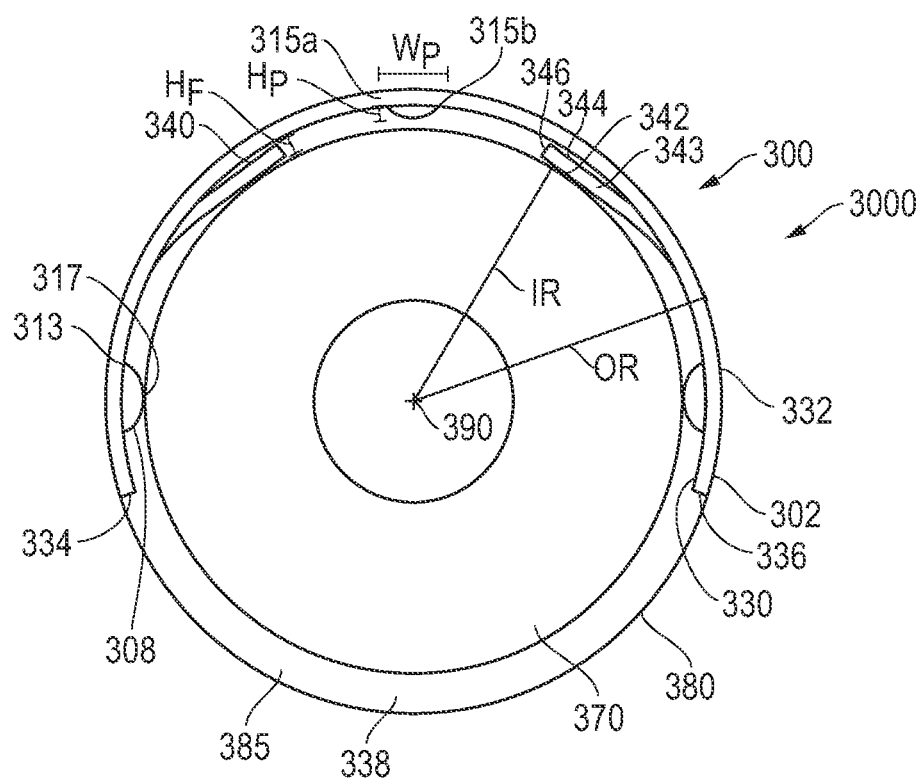
FIG. 3B includes an illustration of an end view of a bearing within an assembly according to a number of embodiments.

In a number of embodiments, the radially extending projections 308 (or waves as described above) may be positioned at or adjacent to an axis along an X direction (generally horizontal relative to the central axis 390 of the inner rotating member 370) while providing enhanced stiffness along the X direction, as shown best in FIG. 3B. Further, a radially extending projection 308 (or wave as described above) may be positioned at or adjacent to an axis along the Y direction (generally vertical relative to the central axis 390 of the inner rotating member 370) while limiting movement of the rotating member 370 in the Y direction, as shown best in FIG. 3B.

As shown in FIGS. 3A and 3B, at least one of the projections 308 may have a circumferential width, $W_P$, defined between a pair of bases 315a, 315b, and a radial height $H_P$, and a circumferential hump 313 extending in the radial direction, the hump 313 rising to and falling from an apex 317 within the circumferential width and being axially bound by a pair of shoulders 311. The apex 317 of the at least one projection 308 may be rounded or squared, and the axial ends of each ridge may terminate at the shoulder 311. In some embodiments, the shoulders 311 of the at least one projection 308 may be tapered.

As shown in FIGS. 3A and 3B, the projection 308 may have a radial height, $H_P$. For purposes of embodiments described herein, the radial height, $H_P$, of the projection 308 is the distance from the apex 317 of the projection 308 to the unformed region 309 of the semi-annular band 302, as shown best in FIG. 3B. According to certain embodiment, the radial height, $H_P$, of the projection 308 may be at least about 0.1 mm or at least about 0.2 mm or at least about 0.3 mm or at least about 0.4 mm or even at least about 0.5 mm. According to still other embodiments, the radial height, $H_P$, of the projection 308 may be not greater than about 10 mm, such as not greater than 8 mm, not greater than 6 mm, 5 mm, 3 mm, 1 mm, 0.9 mm or even not greater than about 0.8 mm. In a number of embodiments, the radial height, $H_P$, of the projection 308 may be in the range of at least about 0.1 mm to no greater than about 1.5 mm. It will be appreciated that the radial height, $H_P$, of the projection 308 may be within a range between any of the minimum and maximum values noted above. It will be further appreciated that the radial height, $H_P$, of the projection 308 may be any value between any of the minimum and maximum values noted above. It can also be appreciated that radial height, $H_P$, of the projection 308 may vary along its circumference and may vary across a plurality of bearings.

The projection 308 may have a circumferential width, $W_P$. For purposes of embodiments described herein, the circumferential width, $W_P$, of the projection 308 is the distance from the edge of one unformed section 309 adjacent to the projection 308 to the unformed section 309' on the circumferentially opposite side of the projection 308, as shown best in FIG. 3A. According to certain embodiment, the circumferential width, $W_P$, of the projection 308 may be at least about 0.1 mm or at least about 0.2 mm or at least about 0.3 mm or at least about 0.4 mm or even at least about 0.5 mm. According to still other embodiments, the circumferential width, $W_P$, of the projection 308 may be not greater than about 20 mm, such as, not greater than about 15 mm, 10 mm, 5 mm, 1 mm, 0.9 mm or even not greater than about 0.8 mm. In a number of embodiments, the circumferential width, $W_P$, of the projection 308 may be in the range of at least about 1 mm to no greater than about 10 mm. It will be appreciated that the circumferential width, $W_P$, of the projection 308 may be within a range between any of the minimum and maximum values noted above. It will be further appreciated that the circumferential width, $W_P$, of the projection 308 may be any value between any of the minimum and maximum values noted above. It can also be appreciated that the circumferential width, $W_P$, of the projection 308 may vary along its circumference and may vary across a plurality of bearings. The ratio of circumferential widths, $W_P$, across a plurality of projections 308 around the semi-annular band 302 may be 1:1, 2:1, 3:1, 4:1, or 5:1.

As shown in FIGS. 3A and 3B, the bearing 300 may include at least one leaf spring element 340. In a number of embodiments, the radially extending projections 308 and the at least one spring element 340 of the bearing 300 may be disposed around a partial circumference of the semi-annular band 302. Further, the radially extending projections 308 and the at least one spring element 340 may be arranged alternatively around the partial circumference of the semi-annular band 302 of the bearing 300. In a number of embodiments, the leaf spring element 340 may take the form of a cantilevered finger, formed in a cutout 303 of the semi-annular band 302. The at least one finger 340 can be coupled to the annular band 302 of the bearing 300 along a first side thereof (i.e. at a proximal end) (indicated at dashed line 341 in FIG. 3A), and continuously disconnected from the semi-annular band 302 along the remaining sides. The at least one finger 340 may extend in the radial direction. In a number of embodiments, a plurality of fingers may extend at various positions around the partial circumference of the semi-annular band, including a portion adjacent to or below an axis along an X direction (generally horizontal relative to the central axis 390 of the inner rotating member 370). In an embodiment, the at least one of the finger 340 may have a straight profile or an arcuate profile. The finger 340 may include at least one generally straight edge and/or at least one generally arcuate edge. In an embodiment, at least one of the fingers 340 may have a polygonal profile. The finger 340 may include at least one polygonal shape. For example, the finger 340 may include a triangle or a quadrilateral shape extending from the semi-annular band 302. In yet another embodiment, the at least one finger 340 may have an arcuate portion and a polygonal portion. In an embodiment, at least two of the fingers 340 have the same geometric shape or size as compared to each other. In a further embodiment, all of the fingers 340 may have the same geometric shape or size as compared to each other. In another embodiment, at least two of the fingers 340 may have different geometric shapes or sizes as compared to each other. In a further embodiment, all of the fingers 340 may have different geometric shapes or sizes as compared to each other.

Each finger 340 can have a linkage portion 343 that defines a radially innermost surface 342 and a radially outermost surface 344. A best fit line of the finger 340 can cant relative to the central axis 390. In a particular embodiment, each finger 340 can further include an end or distal end portion 346 extending radially inward from the radially innermost surface 342 opposite the proximal end (341). The end portion 346 can extend from the radially innermost surface 342 opposite the linkage portion 343. In an embodiment, the outer surface of the end portion 346 can terminate radially inside of the linkage portion 343.

As shown in FIGS. 3A and 3B, the finger 340 may have a radial height, $H_F$. For purposes of embodiments described herein, the radial height, $H_F$, of the finger 340 is the distance from the radially innermost surface 342 of the finger 340 to the unformed region 309 of the semi-annular band 302, as shown best in FIG. 3B. According to certain embodiment, the radial height, $H_F$, of the finger 340 may be at least about 0.1 mm or at least about 0.2 mm or at least about 0.3 mm or at least about 0.4 mm or even at least about 0.5 mm. According to still other embodiments, the radial height, $H_F$, of the finger 340 may be not greater than about 10 mm, such as not greater than 8 mm, not greater than 6 mm, 5 mm, 3 mm, 1 mm, 0.9 mm or even not greater than about 0.8 mm. In a number of embodiments, the radial height, $H_F$, of the finger 340 may be in the range of at least about 0.1 mm to no greater than about 1.5 mm. It will be appreciated that the radial height, $H_F$, of the finger 340 may be within a range between any of the minimum and maximum values noted above. It will be further appreciated that the radial height, $H_F$, of the finger 340 may be any value between any of the minimum and maximum values noted above. It can also be appreciated that radial heights, $H_F$, of the fingers 340 may vary along its circumference and may vary across a plurality of bearings.

The finger 340 may have a circumferential width, $W_F$. For purposes of embodiments described herein, the circumferential width, $W_F$, of the finger 340 is the distance from the edge of one unformed section 309 adjacent to the finger 340 to the unformed section 309" on the circumferentially opposite side of the finger 340, as shown best in FIG. 3A. According to certain embodiment, the circumferential width, $W_F$, of the finger 340 may be at least about 0.1 mm or at least about 0.2 mm or at least about 0.3 mm or at least about 0.4 mm or even at least about 0.5 mm. According to still other embodiments, the circumferential width, $W_F$, of the finger 340 may be not greater than about 20 mm, such as, not greater than about 15 mm, 10 mm, 5 mm, 1 mm, 0.9 mm or even not greater than about 0.8 mm. In a number of embodiments, the circumferential width, $W_F$, of the finger 340 may be in the range of at least about 1 mm to no greater than about 10 mm. It will be appreciated that the circumferential width, $W_F$, of the finger 340 may be within a range between any of the minimum and maximum values noted above. It will be further appreciated that the circumferential width, $W_F$, of the finger 340 may be any value between any of the minimum and maximum values noted above. It can also be appreciated that circumferential width, $W_F$, of the finger 340 may vary along its circumference and may vary across a plurality of bearings. The ratio of circumferential widths, $W_F$, across a plurality of fingers 340 around the semi-annular band 302 may be 1:1, 2:1, 3:1, 4:1, or 5:1.

Figure 4A:
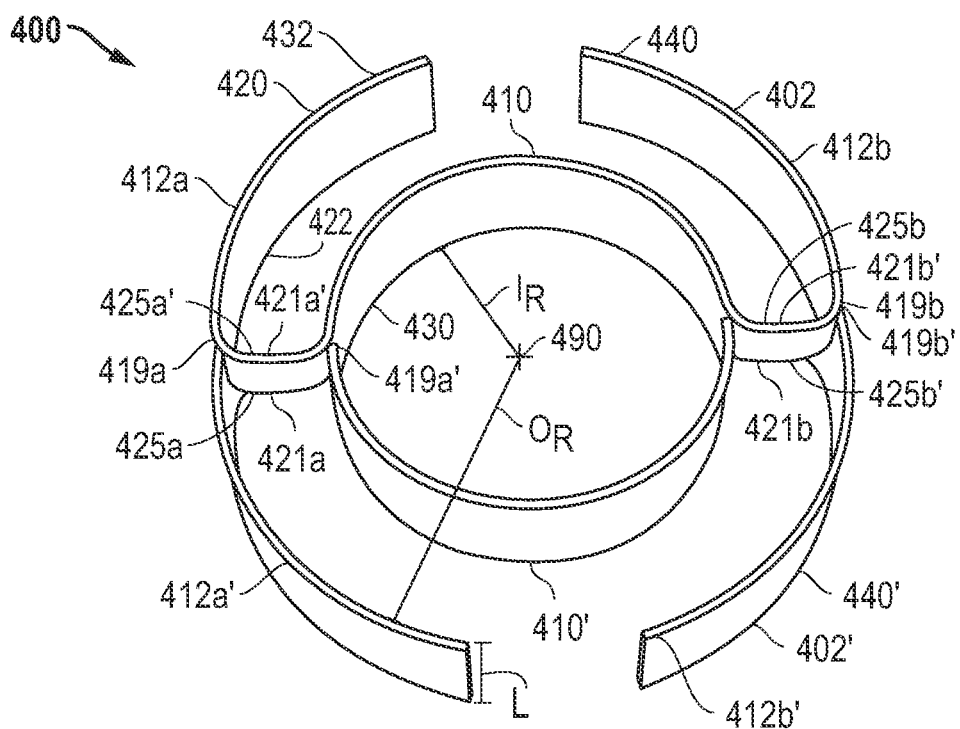
FIG. 4A includes an illustration of a side perspective view of a bearing according to a number of embodiments.

FIG. 4A depicts an illustration of a side perspective view of a bearing 400 according to a number of embodiments and formed from a blank of material or composite material 1000, 1001, 1002, 1003, 1004 as described above. The bearing 400 may include a semi-annular band 402. The semi-annular band 402 may be formed from a blank as described above that may be curved into an arc-like shape about a central axis 490. In a number of embodiments, the bearing 400 may include a plurality of semi-annular bands 402, 402' having a generally arcuate shape. The bearing 400 and/or semi-annular bands 402 may have a first axial end 420, and a second axial end 422. The bearing 300 and/or semi-annular band 302 may have an inner surface 430, and an outer surface 432. The inner surface 430 of the bearing 400 and/or semi-annular band 402 may have a low friction layer that conforms to the shape of the semi-annular band 402 with a substrate forming the outer surface 432, as formed from the composite material 1000, 1001, 1002, 1003, 1004 as described above. Alternatively or additionally, the outer surface 432 of the bearing 400 may have a low friction layer that conforms to the shape of the semi-annular band 402 with a substrate forming the inner surface 430, as formed from the composite material 1000, 1001, 1002, 1003, 1004 as described above. In other embodiments, the low friction layer may be laminated onto both surfaces of the bearing 400 and/or semi-annular band 402.

Figure 4B:
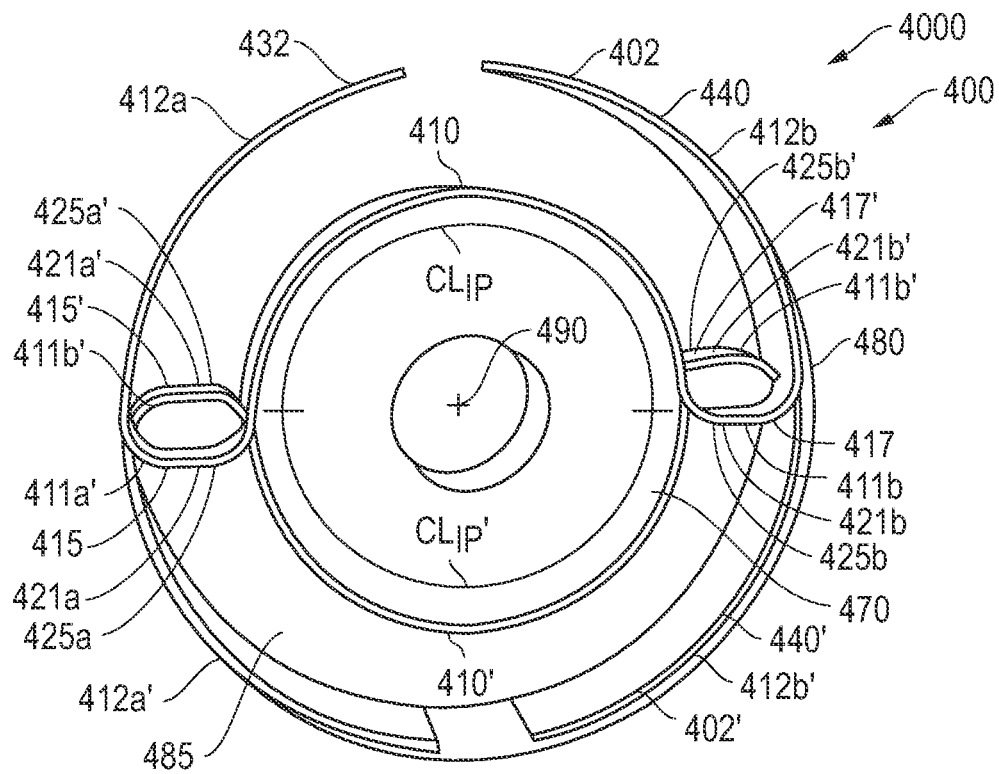
FIG. 4B includes an illustration of an end view of a bearing within an assembly according to a number of embodiments.

The bearing 400 and/or annular band 402 may include at least one leaf spring element 440. The at least one leaf spring element 440 may be adapted to contact a mating component. For example, FIG. 4B depicts an illustration of an end view of a bearing 400 within an assembly and formed from a blank of material or composite material 1000, 1001, 1002, 1003, 1004 as described above where a plurality of leaf spring elements 440, 440' contact an inner rotating member 470 within a bore 485 of an outer member or housing 480 in an assembly 4000. The central axis 490 may be the central axis of the inner rotating member 470 as shown. In a number of embodiments, each leaf spring element 440, 440' can include an inner portion 410 and at least one outer portion 412. In a number of embodiments, each leaf spring element 440, 440' can include a plurality of outer portions 412a, 412b, 412a', 412b'. In a number of embodiments, each leaf spring element 440, 440' can include a plurality of bridge portions 421a, 421b, 421a', 421b'. The first leaf spring element 440 may include a first bridge portion 421a and a second bridge portion 421b. The second spring element 440' may include a first bridge portion 421a' and a second bridge portion 421b'. In a number of embodiments, the first and second bridge portions 421a, 421b, 421a', 421b' may include axial cutouts 425a, 425b, 425a', 425b'. The axial cutouts 425a, 425b, 425a', 425b' may be adapted to couple the first and second leaf spring elements 440, 440' together in the Z direction (along the central axis 490). The axial cutouts 425a, 425b, 425a', 425b' may allow the first and second bridge portions 421a, 421b, 421a', 421b' to overlap each other and reduce the axial length of the bearing 400. In a number of embodiments, the bridge portions 421a, 421b, 421a', 421b' may be located at a first circumferential end 415, 415' and a second circumferential end 417, 417' of each leaf spring element 440, 440'. In a number of embodiments, the bridge portions 421a, 421b, 421a', 421b' may connect the inner portions 410, 410' with the plurality of outer portions 412a, 412b, 412a', 412b' of each leaf spring element 440, 440'. In a number of embodiments, the bridge portions 421a, 421b, 421a', 421b' may be folded over such that the outer portions 412a, 412b, 412a', 412b'overlie the inner portions 410, 410' in each leaf spring element 440, 440' to form at least one folded edge 411a, 411b, 411a', 411b'. In a number of embodiments, each leaf spring element 440, 440' can include two folded edges 411a, 411b, 411a', 411b'. In a number of embodiments, the folded edges 411a, 411b, 411a', 411b' may form an axial interface 419a, 419b, 419a', 419b' to axially couple each leaf spring element 440, 440' to form the bearing 400.

As shown in FIGS. 4A-4B, each leaf spring element 440, 440' can include a circumferential length of the inner portion 410, 410', $CL_{IP}$, $CL_{IP}'$ between the bridge portions 421a, 421b, 421a', 421b' of each leaf spring element 440, 440'. As shown best in FIG. 4B, at least of the first and second bridge portions 421a, 421b, 421a', 421b' may be positioned at or adjacent an axis along the X direction (generally horizontal relative to the central axis 490 of the inner rotating member 470), where the first and second bridge portions 421a, 421b, 421a', 421b' provide enhanced stiffness along the X direction. In a number of embodiments, Further, in a number of embodiments, the inner portions 410, 410' of the plurality of leaf spring elements 440, 440' may join to collectively overlie an entire circumference of the rotating member 470 along their circumferential lengths $CL_{IP}$, $CL_{IP}'$.

In a number of embodiments as shown in FIGS. 3B and 4A, the bearing 300, 400 may have an outer radius OR, from the central axis 390, 490 to the outer surface 332, 432, and OR can be $\geq 0.5$ mm, such as $\geq 1$ mm, $\geq 5$ mm, $\geq 10$ mm, $\geq 15$ mm, or $\geq 20$ mm. The OR can be $\leq 45$ mm, such as $\leq 40$ mm, such as $\leq 35$ mm, such as $\leq 30$ mm, $\leq 20$ mm, $\leq 15$ mm, $\leq 10$ mm, or $\leq 5$ mm. In a number of embodiments, the outer radius OR of the bearing 300, 400 may be in the range of at least about 1 mm to no greater than about 10 mm. It will be appreciated that the outer radius OR of the bearing 300, 400 may be within a range between any of the minimum and maximum values noted above. It will be further appreciated that the outer radius OR of the bearing 300, 400 may be any value between any of the minimum and maximum values noted above. It can also be appreciated that the outer radius OR of the bearing 300, 400 may vary along its circumference and may vary across a plurality of bearings. The ratio of outer radii, OR, across a plurality of bearings 300, 400 may be 1:1, 2:1, 3:1, 4:1, or 5:1.

In a number of embodiments as shown in FIGS. 3B and 4A, the bearing 300, 400 may have an inner radius IR, from the central axis 390, 490 to the inner surface 330, 430, and IR can be ≥1 mm, such as ≥5 mm, ≥7.5 mm, ≥10 mm, ≥15 mm, or ≥20 mm. The inner radius IR can be ≤20 mm, such as ≤15 mm, ≤10 mm, ≤7.5 mm, ≤5 mm, or ≤1 mm. In a number of embodiments, the inner radius IR of the bearing 300, 400 may be in the range of at least about 1 mm to no greater than about 10 mm. It will be appreciated that the inner radius IR of the bearing 300, 400 may be within a range between any of the minimum and maximum values noted above. It will be further appreciated that the inner radius IR of the bearing 300, 400 may be any value between any of the minimum and maximum values noted above. It can also be appreciated that the inner radius IR of the bearing 300, 400 may vary along its circumference and may vary across a plurality of bearings. The ratio of inner radii, IR, across a plurality of bearings 300, 400 may be 1:1, 2:1, 3:1, 4:1, or 5:1

In a number of embodiments as shown in FIGS. 3A and 4A, the bearing 300, 400 may have a length L measured between a first axial end 320, 420 to a second end 322, 422. The length L can be 1 mm, such as ≥5 mm, ≥7.5 mm, ≥10 mm, ≥15 mm, or ≥20 mm. The length L can be ≤20 mm, such as ≤15 mm, ≤10 mm, ≤7.5 mm, ≤5 mm, or ≤1 mm. In a number of embodiments, the length L of the bearing 300, 400 may be in the range of at least about 1 mm to no greater than about 10 mm. It will be appreciated that the length L of the bearing 300, 400 may be within a range between any of the minimum and maximum values noted above. It will be further appreciated that the length L of the bearing 300, 400 may be any value between any of the minimum and maximum values noted above. It can also be appreciated that the length L of the bearing 300, 400 may vary along its circumference and may vary across a plurality of bearings. The ratio of lengths, L, across a plurality of bearings 300, 400 may be 1:1, 2:1, 3:1, 4:1, or 5:1.

In a particular aspect, bearings 300, 400 as described herein may provide a high degree of stiffness in the X direction (generally horizontal relative to the central axis 390, 490 of the inner rotating member 370, 470) while simultaneously providing a lower degree of stiffness in the Y direction (generally vertical relative to the central axis 390, 490 of the inner rotating member 370, 470). In this regard, the assembly can support high side loads while simultaneously permitting normal loads on the bearing 300, 400 to better bias the inner rotating member 370, 470. In an embodiment, the at least one leaf spring element 340, 440 of the bearing 300, 400 may provide a biasing force in an Y direction generally vertical from a central axis 390, 490 of the rotating member 370, 470 where the bearing 300, 400 may have a first stiffness, $S_1$, in the Y direction and a second stiffness, $S_2$, in an X direction generally horizontal from the central axis 390, 490 of the rotating member 370, 470, where $S_2 \geq S_1$. In an embodiment, $S_2 \geq 1.1 S_1$, such as $S_2 \geq 1.2 S_1$, $S_2 \geq 1.5 S_1$, $S_2 \geq 2 S_1$, $S_2 \geq 3 S_1$, or $S_2 \geq 10 S_1$.

In a particular aspect, bearings 300, 400 as described herein may provide a first spring rate $S_1$ in the Y direction. The first spring rate $S_1$ may be the spring rate upon application of force in the range of 1 to 50 N on the bearing 300, 400 against the rotating member 370, 470. The first spring rate $S_1$ in the Y direction may be between 10 and 500 N/mm.

In a particular aspect, bearings 300, 400 as described herein may provide a second spring rate $S_2$ in the Y direction. The second spring rate $S_2$ may be the spring rate upon application of force in the range of 400 to 800 N on the bearing 300, 400 against the rotating member 370, 470. The second spring rate $S_2$ in the Y direction may be between 100 and 10,000 N/mm.

As stated above, the bearing according to embodiments herein may be used in an assembly. For example and according to a number of embodiments, the assembly may be a steering assembly for a vehicle. The steering assembly may include an electric motor. The electric motor may include a stator and a rotor, an input shaft operatively connected to the rotor and adapted to rotate therewith, an output shaft associated with a steering column, and a gearbox adapted to transfer torque from the input shaft to the output shaft in response to a measure of torque in the output shaft produced by a torque sensor as described in detail below. The motor may apply an increasing torque to the output shaft as the measured torque increases, thus applying an assistance torque which helps to steer the vehicle. Steering assemblies such as these may use a worm gear and worm wheel gearbox to transfer torque from the input shaft to the output shaft (the worm usually provided on the input shaft and the wheel on the output shaft) or steering column. An example of this may be a power steering system.

Figure 5A:
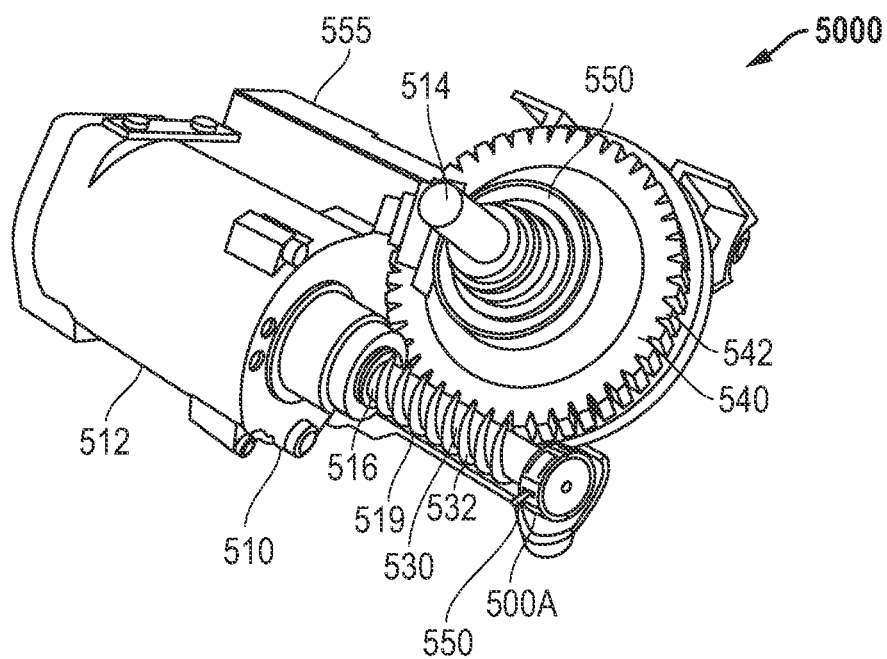
FIG. 5A includes a side cutaway view of a bearing according to embodiments herein used in a steering assembly in accordance with an embodiment.
Figure 5B:
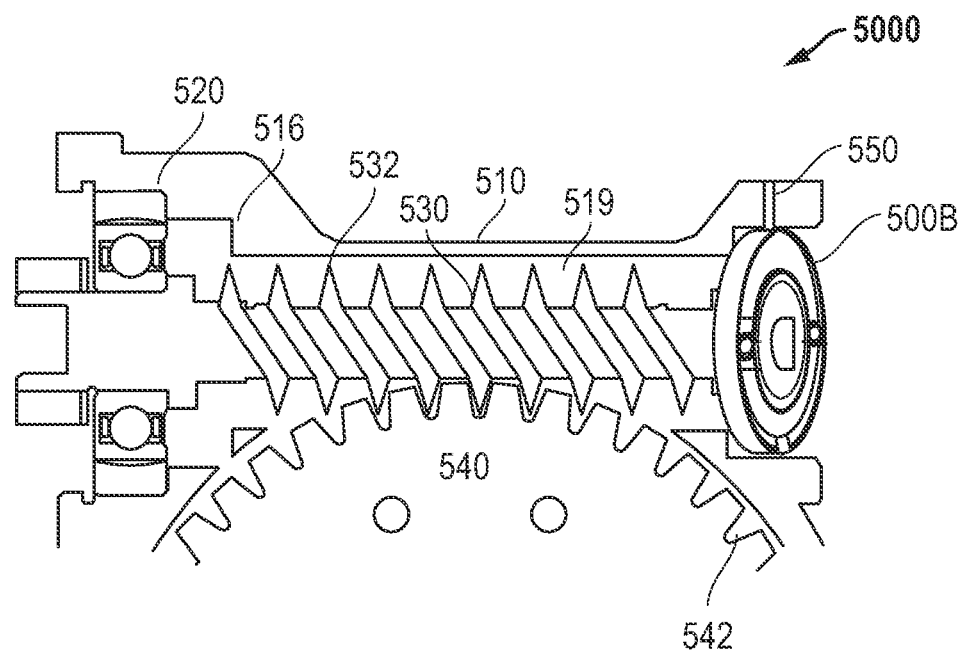
FIG. 5B includes a cross-sectional plain view of a bearing according to embodiments herein used in an exemplary steering assembly in accordance with an embodiment.

FIGS. 5A-5B illustrate a bearing according to embodiments herein used in an exemplary steering assembly 5000 in accordance with a number of embodiments. FIG. 5A includes a side cutaway view of a bearing according to embodiments herein used in a steering assembly 5000 in accordance with an embodiment. FIG. 5B includes a cross-sectional plain view of a bearing according to embodiments herein used in an exemplary steering assembly 5000 in accordance with an embodiment. In a number of embodiments, the steering assembly 500 may be a power-assisted steering assembly and may include an anti-rattle device. Referring to FIG. 5A, the steering assembly 5000 may include a housing 510. The steering assembly 500 may further include a motor 512 for applying torque to an output shaft 514 operatively connected to a steering column shaft. The motor 512 may include a stator and a rotor (not shown). The motor 512 may be mounted onto a side of the housing 510. One end of an input shaft 516 (or inner rotating member as described above) extends through a first opening into an inner cavity 519 of the housing 510 and may be supported by a first bearing element 520. The motor 512 may be operatively connected to the input shaft 516 or (or inner rotating member) and adapted to rotate the input shaft 516. The input shaft 516 may be connected to the rotor within the motor 512 adjacent to the first bearing element 520. The other end of the input shaft 516 passes through a second opening on an opposite side of the housing 510 to the first opening, and may be supported by a second bearing element 522. The first and second bearing elements 520, 722 may support the input shaft 516 within the cavity 519 of the housing 510 and may contact the housing 510 on a side of the cavity 519. The first and second bearing elements 520, 522 may be disposed between the rotating member (input shaft 516) and the housing 510. The input shaft 516 may include a worm gear 530 between the two bearing elements 520, 522 adapted to contact and engage a worm wheel 540 that may be operatively connected to the output shaft 514 of the steering assembly 5000. The engagement between the worm gear 530 and the worm wheel 540 may take place through the use of teeth 532, 542, provided on each respectively. The worm gear 530 may be adapted to rotate (along with the inner shaft 516, i.e. the rotating member) by the motor 512 which rotates the worm wheel 540 based on the engagement of the teeth 532 of the worm gear 530 with the teeth 542 of the worm wheel 540. In use, an output from a torque sensor 550 adapted to measure the torque in the output shaft 514 (or a steering shaft operatively connected thereto) may be passed to an electronic control unit (ECU) 555 in turn to produce a motor drive signal which controls the torque produced by the motor 512. The motor 512 then transfers torque through the motor rotor to the input shaft 516 and onto the output shaft 514 to provide assistance to aid a driver of the vehicle.

The first bearing element 520 may be secured to the housing 510 and acts as a pivot point about which the input shaft 516 may tilt, as shown best in FIG. 5B. It may prevent substantially all radial movement of the shaft 516 as it passes through the first bearing element 520. The first bearing element 520 may include any components commonly used in the bearing arts. By non-limiting example, the first bearing element 520 may include a ball bearing or roller bearing cartridge having an inner bearing race which co-operates with the input shaft 516 and an outer bearing race spaced around the inner race, bearings being provided therebetween. The ball bearing is exemplary and any well known bearing assembly can be used subject to meeting the requirements for tolerance and load bearing set out by the designer for the first bearing element 520.

The second bearing element 522 may include multiple components. The second bearing element 522 may include a shaft 550. The shaft 500 may support a bearing according to embodiments disclosed herein. As shown in FIG. 5A, the shaft 500 may support the bearing 500A shown in more detail and described above in FIGS. 3A-3B. Alternatively, as shown in FIG. 5B, the shaft 500 may support the bearing 500B shown in more detail and described above in FIGS. 4A-4B. The bearing 500A, 500B in the second bearing element 522 may surround and support the input shaft 516 similarly to the rotating member described above. The shaft 550 may act to bias the bearing 500A, 500B against the input shaft 516. The shaft 550 may be operatively coupled to the housing 510 and may act to bias the bearing 500A, 500B against the input shaft 516. Further, the bearing 500A, 500B may act to bias the worm gear 530 teeth 532 into mesh with the worm wheel 540 teeth 542 and to allow it to maintain a meshed condition (i.e. where there is correct clearance between the flanks on either sides of the engaging worm gear and worm wheel teeth 532, 542) for the range of worm wheel 540 size and position variations (due to manufacturing tolerances), temperatures and states of tooth wear. The amount of force depends on how much the bearing 500A, 500B is configured.

It may be required to maintain this meshed condition for a range of torque values, measured at the worm wheel 540, (for example up to 4 N-m in one application) in order to prevent gear rattle when driving. In a number of exemplary embodiments, a force in a range of 1-50 N may need to be applied to the worm gear 530, radially with respect to the worm wheel 540 in order to maintain meshing in a range of 0.5-50 N-m worm wheel 540 torque.

The steering assembly components disclosed herein may be made from metal, polymer, or a combination thereof. The metal can be a single metal, such as aluminum, or a metal alloy such as steel, aluminum alloy, brass, etc. The polymer may be a thermoplastic polymer. The thermoplastic polymer may be a polyamide thermoplastic. Further, the thermoplastic can be polyoxymethylene (POM). Additionally, the thermoplastic polymer can be a polyethylene thermoplastic such as high-density polyethylene (HDPE). The steering assembly components may be made from die cast metal or injection molded plastic using molding or drawing techniques.

According to various embodiments herein, bearings are provided that may provide improved torque and tolerance performance which may eliminate additional parts, lessen installation and manufacturing time, and provide easier use for assemblies while eliminating or lessening noise, harshness, and vibration. More particularly, according to embodiments herein, bearings may provide better tolerance and torque performance that improves the contact and meshing of worm gear and worm wheel teeth in anti-rattle devices and steering assemblies, lessening rattle/noise and improving steering assembly and vehicle performance. This may lessen and/or compensate for component wear and provide a more stable performance of the assembly and vehicle over the lifetime of its use.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

In addition, in the foregoing Detailed Description, various features can be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter can be directed to less than all features of any of the disclosed embodiments. Thus, the following claims are incorporated into the Detailed Description, with each claim standing on its own as defining separately claimed subject matter.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1: A bearing for disposition between a housing and a rotating member, the bearing comprising: at least one leaf spring element that provides a biasing force in a Y direction; wherein the bearing has a first stiffness, $S_1$, in the Y direction and a second stiffness, $S_2$, in an X direction perpendicular to the Y direction, wherein $S_2 \geq S_1$, and wherein the bearing comprises a metal substrate and a low friction layer overlying at least one surface of the substrate and adapted to contact the rotating member.

Embodiment 2: A bearing for disposition between a housing and a rotating member, the bearing comprising: at least one leaf spring element that provides a biasing force in a Y direction; wherein the bearing has a first stiffness, $S_1$, in the Y direction and a second stiffness, $S_2$, in an X direction perpendicular to the Y direction, wherein $S_2 \geq S_1$, and wherein the bearing further comprises 1) a plurality of leaf spring elements and a plurality of radially extending projections; or 2) a plurality of leaf spring elements comprising a radially inner portion, a radially outer portion, and a bridge portion connecting the radially inner portion and the radially outer portion, wherein bridge portion is located at a circumferential end of the at least one leaf spring element, wherein the inner and outer radial portions are folded over such that the outer portions overlie the inner portion.

Embodiment 3: An assembly comprising: a housing; a rotating member; and a bearing disposed between the housing and the rotating member, the bearing comprising: at least one leaf spring element that provides a biasing force in a Y direction; wherein the bearing has a first stiffness, $S_1$, in the Y direction and a second stiffness, $S_2$, in an X direction perpendicular to the Y direction, wherein $S_2 \geq S_1$, and wherein the bearing comprises a metal substrate and a low friction layer overlying at least one surface of the substrate and adapted to contact the rotating member.

Embodiment 4: The bearing or assembly of any of the preceding embodiments, wherein $S_2 \geq 1.1 S_1$, such as $S_2 \geq 1.2 S_1$, $S_2 \geq 1.5 S_1$, $S_2 \geq 2 S_1$, or $S_2 \geq 3 S_1$.

Embodiment 5: The bearing or assembly of any of the preceding embodiments, wherein the bearing comprises a first spring rate $SR_1$ having a range of 10 to 500, and a second spring rate $SR_2$ having a range of 100 to 10,000 in the Y direction.

Embodiment 6: The bearing or assembly of any of the preceding embodiments, wherein the bearing further comprises a semi-annular band comprising a plurality of radially extending projections and the at least one leaf spring element disposed around a partial circumference of the semi-annular band.

Embodiment 7: The bearing or assembly of embodiment 6, wherein the radially extending projections comprise waves that are positioned at or adjacent an axis along the X direction, wherein the waves provide enhanced stiffness along the X direction.

Embodiment 8: The bearing or assembly of embodiment 6, wherein a radially extending projection comprising a wave that is positioned at or adjacent an axis along the Y direction, wherein the radially extending projections limits movement of the rotating member in the Y direction.

Embodiment 9: The bearing or assembly of any of embodiments 7-8, wherein the waves are integral with the semi-annular band such that the waves are contiguous with the semi-annular band around the entirety of a periphery of the semi-annular band.

Embodiment 10: The bearing or assembly of any of embodiments 6-9, wherein the at least one leaf spring element comprises a radially extending finger, wherein the radially extending finger is cantilevered, wherein the radially extending finger comprises a proximal end that is connected to the semi annular band and a distal end opposite the proximal end.

Embodiment 11: The bearing or assembly of any of embodiments 6-10, wherein the semi-annular band overlies at least 180° and no greater than 300° of the circumference of the rotating member.

Embodiment 12: The bearing or assembly of any of embodiments 1-5, wherein the at least one leaf spring element comprises a radially inner portion, a radially outer portion, and a bridge portion connecting the radially inner portion and the radially outer portion, wherein bridge portion is located at a circumferential end of the at least one leaf spring element, wherein the inner and outer radial portions are folded over such that the outer portions overlie the inner portion.

Embodiment 13: The bearing or assembly of embodiment 12, wherein the at least one leaf spring element comprises first and second leaf spring elements, and wherein the first and second leaf spring elements join to collectively overlie an entire circumference of the rotating member.

Embodiment 14: The bearing or assembly of embodiment 12, wherein each of the first and second leaf spring elements comprise first and second bridge portions, wherein the first and second bridge portions of each of the first and second leaf spring elements are positioned at or adjacent an axis along the X direction, wherein the first and second bridge portions providing enhanced stiffness along the X direction.

Embodiment 15: The bearing or assembly of embodiment 14, wherein the first and second bridge portions comprise complementary axial cutouts adapted to couple the first and second leaf spring elements together in a Z direction such that the first and second bridge portions overlap each other, wherein the axial cutouts reduce the axial length of the bearing.

Embodiment 16: The assembly of embodiment 3, wherein the rotating member comprises a worm gear comprising a plurality of teeth.

Embodiment 17: The assembly of embodiment 16, further comprising a worm wheel comprising a plurality of teeth adapted to mesh with the teeth of the worm gear.

Embodiment 18: The bearing or assembly of any of the preceding embodiments, wherein the low friction layer comprises a polymer.

Embodiment 19: The bearing or assembly of embodiment 18, wherein the low friction layer comprises a polyketone, a polyaramid, a polyimide, a polyetherimide, a polyamideimide, a polyphenylene sulfide, a polyphenylene sulfone, a fluoropolymer, a polybenzimidazole, a derivation thereof, or a combination thereof.

Embodiment 20: The bearing or assembly of any of the preceding embodiments, wherein the substrate comprises a metal or alloy thereof.

Embodiment 21: The bearing or assembly of embodiment 20, wherein the substrate comprises stainless steel or spring steel.

Embodiment 22: The bearing or assembly of any of embodiments 2-21, wherein the assembly comprises an anti-rattle assembly for a steering assembly.

Note that not all of the features described above are required, that a portion of a specific feature may not be required, and that one or more features may be provided in addition to those described. Still further, the order in which features are described is not necessarily the order in which the features are installed.

Certain features are, for clarity, described herein in the context of separate embodiments, may also be provided in combination in a single embodiment. Conversely, various features that are, for brevity, described in the context of a single embodiment, may also be provided separately or in any subcombinations.

Benefits, other advantages, and solutions to problems have been described above with regard to specific embodiments, However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range, including the end range values referenced. Many other embodiments may be apparent to skilled artisans only after reading this specification. Other embodiments may be used and derived from the disclosure, such that a structural substitution, logical substitution, or any change may be made without departing from the scope of the disclosure. Accordingly, the disclosure is to be regarded as illustrative rather than restrictive.

What is claimed is:

1. A bearing for disposition between a housing and a rotating member, the bearing comprising:
at least one leaf spring element that provides a biasing force in a Y direction;
wherein the bearing has a first stiffness, $S_1$, in the Y direction and a second stiffness, $S_2$, in an X direction perpendicular to the Y direction, wherein $S_2 \geq S_1$, and wherein the bearing comprises a metal substrate and a low friction layer overlying at least one surface of the substrate and adapted to contact the rotating member, wherein the bearing comprises an axial gap, wherein the at least one spring element comprises a cantilevered finger formed in a cutout of the semi-annular band.

2. The bearing of claim 1, wherein $S_2 \geq 1.1 S_1$.

3. The bearing of claim 1, wherein the bearing comprises a first spring rate $S_1$ having a range of 10 to 500, and a second spring rate $S_2$ having a range of 100 to 10,000.

4. The bearing of claim 1, wherein the bearing further comprises a semi-annular band comprising a plurality of radially extending projections and the at least one leaf spring element disposed around a partial circumference of the semi-annular band.

5. The bearing of claim 4, wherein the radially extending projections comprise waves that are positioned at or adjacent an axis along the X direction, wherein the waves provide enhanced stiffness along the X direction.

6. The bearing of claim 5, wherein the waves are integral with the semi-annular band such that the waves are contiguous with the semi-annular band around the entirety of a periphery of the semi-annular band.

7. The bearing of claim 4, wherein at least one radially extending projection comprises a wave that is positioned at or adjacent an axis along the Y direction, wherein the radially extending projections limits movement of the rotating member in the Y direction.

8. The bearing of claim 4, wherein the at least one leaf spring element comprises a radially extending finger, wherein the radially extending finger is cantilevered, wherein the radially extending finger comprises a proximal end that is connected to the semi annular band and a distal end opposite the proximal end.

9. The bearing of claim 4, wherein the semi-annular band overlies at least 180° and no greater than 300° of the circumference of the rotating member.

10. The bearing of claim 4, wherein at least one projection of the plurality of radially extending projections is separated from a neighboring projection by an unformed section of the semi-annular band.

11. The bearing of claim 1, wherein the low friction layer comprises a polymer.

12. The bearing of claim 11, wherein the low friction layer comprises a polyketone, a polyaramid, a polyimide, a polyetherimide, a polyamideimide, a polyphenylene sulfide, a polyphenylene sulfone, a fluoropolymer, a polybenzimidazole, a derivation thereof, or a combination thereof.

13. The bearing of claim 1, wherein the bearing overlies the rotating member no greater than 345 degrees of the circumference of the rotating member.

14. The bearing of claim 1, wherein the bearing overlies the rotating member no greater than 180 degrees of the circumference of the rotating member.

15. The bearing of claim 1, wherein the at least one spring element comprises a cantilevered finger comprising an end portion extending radially inward.

16. An assembly comprising:
a housing;
a rotating member; and
a bearing disposed between the housing and the rotating member, the bearing comprising:
at least one leaf spring element that provides a biasing force in a Y direction;
wherein the bearing has a first stiffness, $S_1$, in the Y direction and a second stiffness, $S_2$, in an X direction perpendicular to the Y direction, wherein $S_2 \geq S_1$, and wherein the bearing comprises a metal substrate and a low friction layer overlying at least one surface of the substrate and adapted to contact the rotating member, wherein the bearing comprises an axial gap.

17. The assembly of claim 16, wherein the rotating member comprises a worm gear comprising a plurality of teeth.

18. The assembly of claim 17, further comprising a worm wheel comprising a plurality of teeth adapted to mesh with the teeth of the worm gear.

* * * * *